Aug. 30, 1966  C. D. HOBSON  3,270,117
APPARATUS AND METHOD FOR PRODUCING A PRECISION RUBBER TUBE
Filed Aug. 17, 1964  3 Sheets-Sheet 1
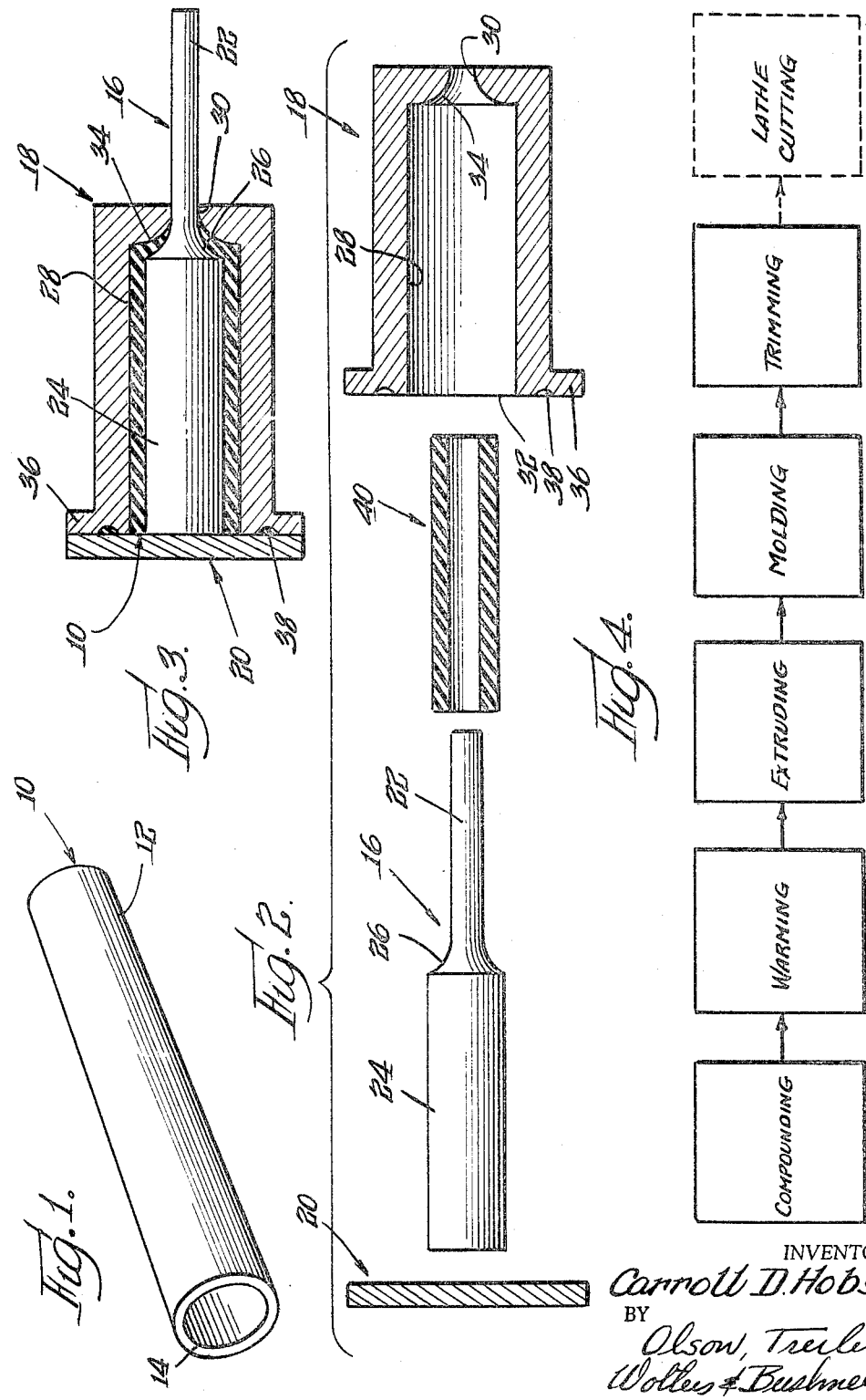
INVENTOR.
Carroll D. Hobson
BY
Olson, Trexler,
Wolters & Bushnell attys

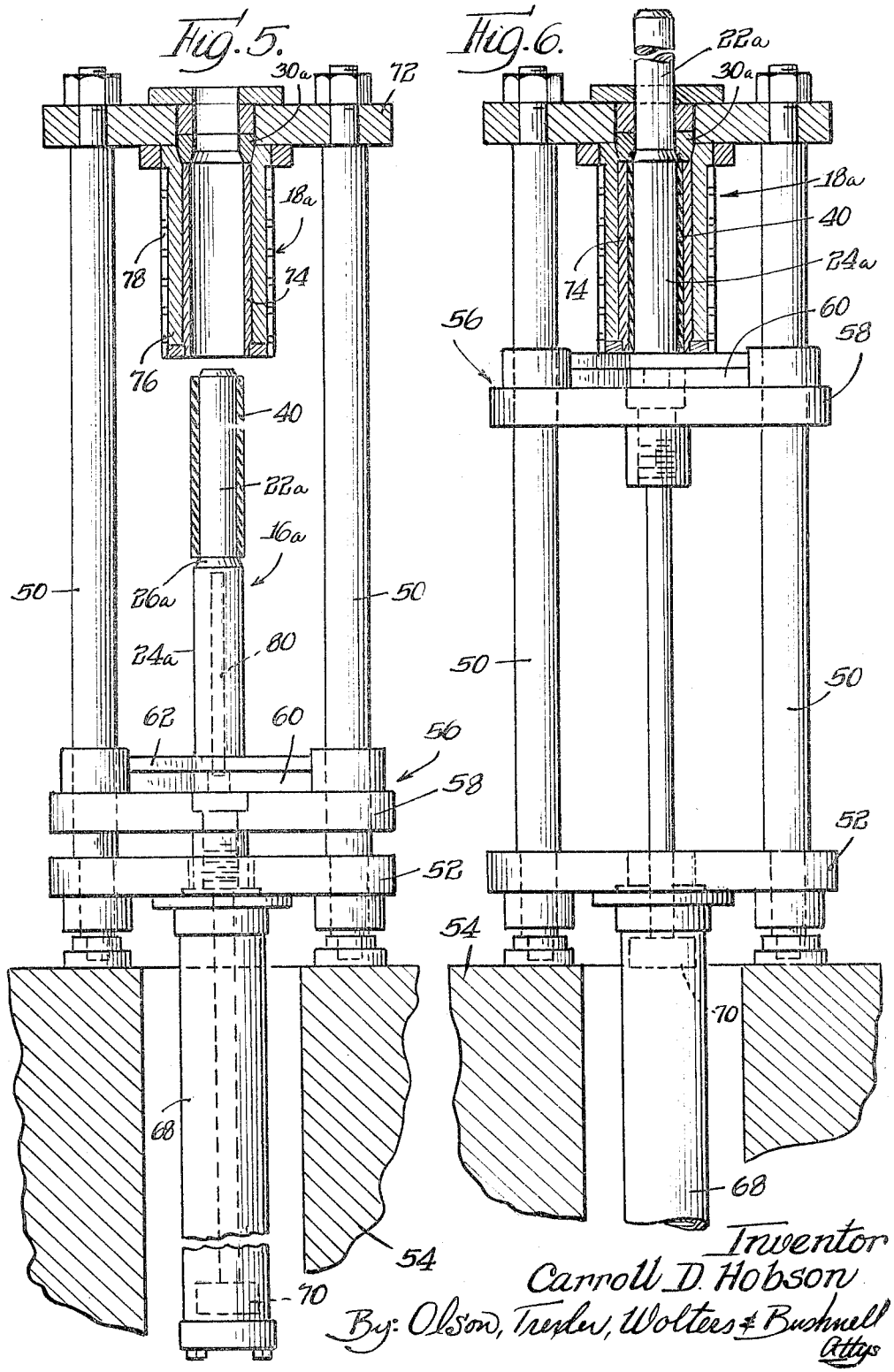

Aug. 30, 1966 C. D. HOBSON 3,270,117
APPARATUS AND METHOD FOR PRODUCING A PRECISION RUBBER TUBE
Filed Aug. 17, 1964 3 Sheets-Sheet 3
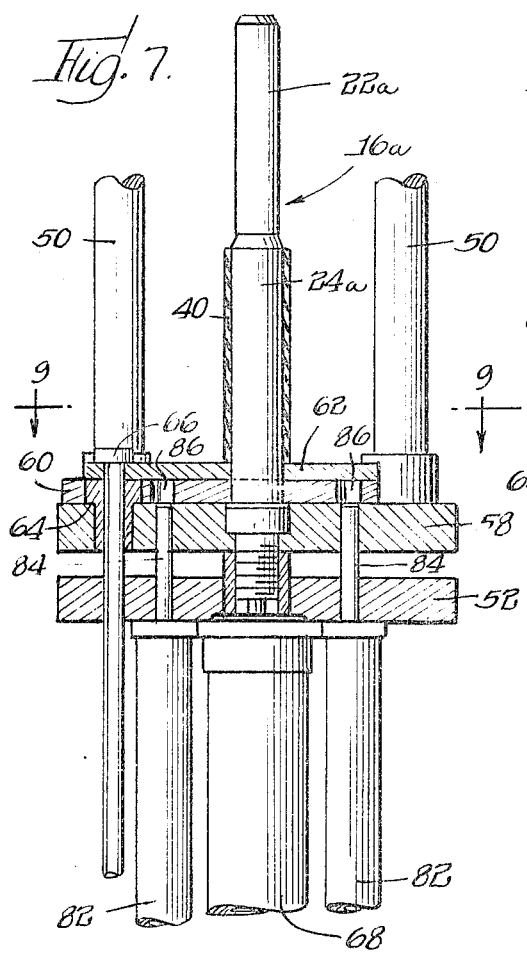
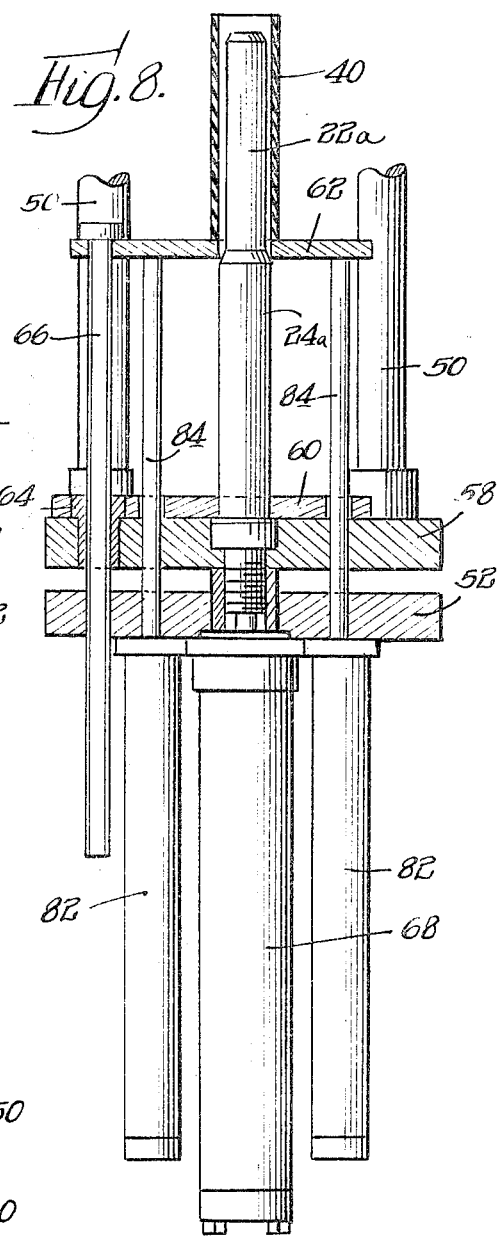
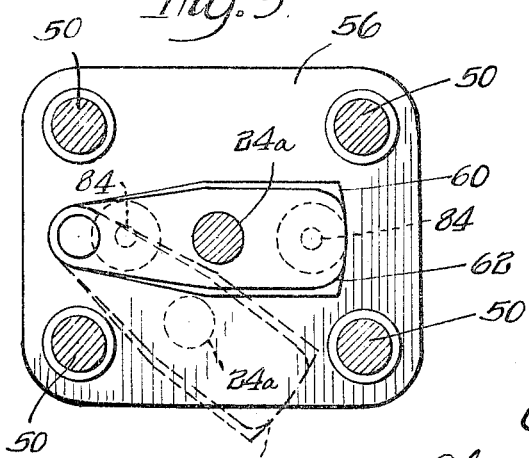
Inventor
Carroll D. Hobson
By: Olson, Trexler, Wolters & Bushnell
attys

United States Patent Office 3,270,117
Patented August 30, 1966

3,270,117
APPARATUS AND METHOD FOR PRODUCING A PRECISION RUBBER TUBE
Carroll D. Hobson, Goshen, Ind., assignor to Goshen Rubber Co., Inc., Goshen, Ind., a corporation of Indiana
Filed Aug. 17, 1964, Ser. No. 391,067
6 Claims. (Cl. 264—320)

This invention relates generally to the protection of molded rubber goods and especially to the production of precisely dimensioned, tubular parts.

Tubular rubber parts requiring close control of the inside and outside dimensions and precise spacing of the inner and outer surfaces have heretofore been manufactured according to the following method. Crude rubber stock is first broken down in a masticating and mixing mill which consists of two rolls revolving at different speeds and heated or cooled as desired. After the crude rubber is sufficiently milled, various compounding ingredients such as vulcanizing agents, accelerators, softeners and pigments are added. When these latter ingredients are appropriately incorporated with the crude rubber, the resultant compound is passed to a slab-off mill from which it is extracted in sheet form. These sheets are stored until such time as they are to be fabricated into molded rubber articles.

Prior to actual fabrication, the sheets from the slab-off mill are passed through a warming mill which consists of a series of rollers of different size or moving at different speeds whereby to heat the rubber compound by friction. The rubber compound is extracted from the warming mill in sheets that are transferred to an extruder which produces a warm, raw rubber, tubular element.

This tubular element is fitted onto a cylindrical mandrel, the mandrel having been previously machined to the desired size and shape of the inside of the tubular product which is to be molded. Thereafter, wet cotton or nylon tape is tightly spiraled over the stock; and a number of the resultant assemblies are placed in an open-steam vulcanizer for curing of the rubber compound. Pressure for molding results from shrinkage of the cloth wrap.

While the inside dimension and finish of the molded tubular element is accurately controlled, the external surface is rough and only approximately dimensioned because of the nature of the fabric wrap. Accordingly, it has been found necessary to grind the outer surface of the tubular member in order to establish the desired outside dimension and the desired concentricity of the inner and outer surfaces. This method has proved to be both time consuming and expensive.

Therefore, an important object of the present invention is to provide an apparatus and method for producing a precision rubber tube in a simple, rapid and economical manner.

A more general object of the invention is to provide a new and improved apparatus and method for producing precision rubber tubes.

Another object of the invention is to provide apparatus for producing an accurately dimensioned, tubular rubber element.

Yet another object of the invention is to provide apparatus for producing rubber parts having precise spacing of the inner and outer surfaces.

Additional objects and features of the invention pertain to the particular structure, arrangements, and methods whereby the above objects are attained.

Apparatus in accord with the invention includes a male die comprised of a small diameter cylindrical portion adapted to receive a quantity of rubber material thereabout, a larger diameter cylindrical portion having an outer surface corresponding to the inner surface of the finished rubber element and a tapering portion connected between the cylindrical portions in coaxial relationship; a female die comprised of a cylindrical cavity of greater transverse dimension than the larger cylindrical portion of the male die, the walls of the cavity corresponding to the outer surface of the finished rubber element, the female die being further comprised of a cylindrical passageway at one end coaxial with the cavity for passing the smaller cylindrical portion of the male die and for locating the male die in the female die; and a plate-like member closing off one end of the annular space between the male and the female dies.

The invention, both to its apparatus and method aspects, will be better understood by reference to the following disclosure and drawing forming a part thereof, wherein:

FIG. 1 is a perspective view of a vulcanized tubular rubber element produced in accordance with the present invention:

FIG. 2 is a side elevational view of apparatus diagrammatically set forth for producing the rubber element of FIG. 1, the apparatus being shown disassembled;

FIG. 3 is a side elevational view of the apparatus of FIG. 2 showing the apparatus assembled for molding the rubber element;

FIG. 4 is a schematic block diagram delineating the method steps of the invention;

FIG. 5 is an assembly view, partly in section, of apparatus, more completely set forth, for producing the rubber element of FIG. 1;

FIG. 6 is a view of the structure of FIG. 5, in a different position;

FIGS. 7 and 8 are partial views of the structure of FIG. 5, more particularly illustrating the action of the stripper mechanism; and FIG. 9 is a transverse sectional view of the structure of FIG. 7 on the line 9—9 thereof.

Referring now in detail to the drawings, and first to FIGS. 1–4 thereof, specifically in FIG. 1, a vulcanized tubular rubber element will be seen indicated generally by the numeral 10. Tubular element 10 is ordinarily arranged to possess an axial dimension considerably in excess of its major transverse dimension. The tubular element 10 includes an as-molded, cylindrical exterior surface 12 and an as-molded, cylindrical interior surface 14, which surfaces are accurately spaced apart and precisely concentric throughout the length of the element.

In FIGS. 2 and 3, there is diagrammatically shown apparatus for producing the tubular element 10. This apparatus will be seen to comprise a male die member 16, a female die member 18 and a plate-like member 20, these parts being fabricated from steel or other suitable material in compliance with customary mold-making practice. The male die member 16 includes a right circular cylindrical portion 22, a relatively larger diameter, right circular cylindrical portion 24 and a conical or tapering portion 26 interconnecting the portions 22 and 24. The portions 22, 24 and 26 are disposed on a common longitudinal axis; and while the portion 26 is shown to possess a concave or negative spherical taper, a conic taper may also be employed to advantage.

The female die member 18 will be seen to include a right circular cylindrical cavity 28 having a greater transverse dimension than the cylindrical portion 24 of male die member 16. The female die member 18 also includes a cylindrical passageway 30 at one end, an open end 32 opposite to the passageway 30 and a tapering throat 34 communicating the cavity 28 with the passageway 30. It is to be noted that the passageway 30, the throat 34 and the cavity 28 are disposed on a common longitudinal axis, the walls of the throat advantageously forming a smooth juncture with the walls of the passageway. The female die member 18 additionally includes an annular flange portion 36 encompassing the open end 32; and advantageously, an annular flash groove 38 is fashioned in the sidewall of flange 36 opening in the same direction as the end 32. Furthermore, it is to be observed that the throat 34 is provided with a convex or positive spherical taper as compared with the concave or negative spherical taper provided on the portion 26 of the male die member.

In accordance with the invention and referring to FIG. 4, raw rubber stock is masticated and compounded with accelerators, vulcanizing agents, pigments and other suitable ingredients on a conventional mixing mill, not shown. Thereafter, the resultant rubber compound is conducted directly to an extruder of any well known construction; or if the compound from the mixing mill has been slabbed, it is warmed on a mixing mill or similar apparatus prior to being transferred to the extruder. The extruder produces a long tubular element of warm but unvulcanized rubber material; and a suitable length is cut to form a sleeve such as the sleeve 40 shown in FIG. 2. Sleeve 40 is arranged to possess an inside dimension approximating the outside dimension of cylindrical portion 22 of the male die member. Sleeve 40 is also cut to an appropriate length to provide the proper volume of rubber compound for the molding operation.

The molding step is carried out by first slipping the rubber sleeve 40 over the cylindrical portion 22. Thereafter, the male die member 16 is assembled to the female die member 18; and as the cylindrical portion 22 is guided into engaged relationship with the passageway 30 by means of the throat 34, the rubber material comprising the sleeve 40 is transferred from the cylindrical portion 22 over the tapering portion 26 and onto the cylindrical portion 24 by the action of the walls of throat 34. The cylindrical portion 22 and the passageway 30 are arranged to cooperate in closely fitting arrangement in order to close off the corresponding end of the mold apparatus.

As the male die member 16 is progressively projected into the female die member 18, the raw rubber sleeve 40 is gradually transferred to encompassing relationship with the cylindrical portion 24; and when the free end of cylindrical portion 24 is flush with the open end 32 of die member 18, the sleeve 40 will have been resituated to the position shown in FIG. 3. There, it will be noted that the rubber material of sleeve 40 completely fills the annular mold cavity defined between the die members 16 and 18. It will also be noted that the more abrupt taper of the throat 34 cooperates with the less abrupt taper of the portion 26 to form a flaring, annular sprue cavity therebetween.

In practice, the plate-like member 20 is desirably employed in urging the male die member 16 into assembled relationship with the female die member 18. Accordingly, as the free end of portion 24 is brought flush with the sidewall of flange 36, the annular mold cavity will be closed off by means of the plate-like member 20 whereby to preserve the pressure on the raw rubber material. Any slight excess rubber compound is transferred to the flash groove 38 in the conventional manner. Advantageously, the plate 20 is appropriately clamped to the flange 36 to insure preservation of the pressure on the rubber compound during vulcanization. If desired, the plate-like member 20 can be attached to the male die member 16 at the free end of portion 24 as by bolts or other suitable fasteners; or alternatively, the plate-like member 20 may be fashioned integrally with the male die member 16.

The heat necessary for vulcanization of the rubber material is appropriately provided, as for example by means of electrical heating elements, now shown, embedded in the male die member 16 and in the female die member 18. Many of the common rubber compound formulations can be cured in approximately two or three minutes using the apparatus of the invention.

After the rubber material has been vulcanized, the mold apparatus is opened; and the die members are disassembled, the molded element being thereafter stripped from the mold.

It is to be recognized that concentricity in the finished tubular element is insured by precisely aligning the die members 16 and 18. This is accomplished by the cooperation of cylindrical portion 22 and the cylindrical passageway 30. Precise eccentricity of the inner and outer surfaces of the tubular element can also be achieved by appropriate positioning of the passageway 30 relative to the longitudinal axis of cavity 28. Moreover, since the wall of cavity 28 corresponds with the exterior surface of the finished tubular element and since the exterior surface of the cylindrical portion 24 corresponds with the interior surface of the tubular element, any advantageous finish or texture can be applied to the surfaces of the tubular element by appropriately configurating the corresponding surfaces of either the cavity 28 or the portion 24.

After the cured tubular element is separated from the mold apparatus, the sprue portion defined between throat 34 and portion 26 is readily trimmed off by means of a band saw or other suitable means; and if it is desired to produce precision washers or gaskets, a mandrel, not shown, is inserted in the vulcanized tubular element in order to facilitate lathe cutting of such parts.

Because of the presence of a rigid die member both interior of and exterior to the tubular rubber element being molded, the inside and outside dimensions of the element are accurately established; and because the male die member 16 is accurately positioned in the female die member 18 by coaction of passageway 30 and portion 22, the inner and outer surfaces of the tubular element are precisely spaced apart.

In FIGS. 5–9 apparatus for reforming the rubber tubular element is more particularly set forth, corresponding to the diagrammatic apparatus set forth in FIGS. 2 and 3 heretofore described.

Referring to FIG. 5, there is set forth molding apparatus comprising a series of upstanding pedestals 50, secured to a frame or base plate member 52. As best shown in FIG. 9, four pedestal members 50 are provided. Base 52 is carried by a suitable foundation 54, as will be understood.

Slidable upon the pedestals 50 is a platen structure 56, the platen structure more particularly comprising a base plate 58, a plate or arm 60 pivotally carried by the base plate on its upper surface, and a stripper plate 62 which is superposed upon the upper face of the pivoted plate or arm 60.

As best shown in FIG. 7, the arm plate 60 is pivotally mounted upon the base plate 58 by means of a pivot bushing 64, which bushing is press-fitted into the arm or plate 60 and is rotatably journaled in the base plate 58. Stripper plate 62 has press-fitted therein a pin 66 having splined interconnection with the bushing 64, the arrangement thus being such that the stripper 62 may be moved longitudinally or vertically in respect to the arm or plate 60, but the arm plate and stripper are constrained for rotation as a unit around the axis of pin 66 and bushing 64, in respect to the base plate 58.

The platen structure composed of base plate 58, arm 60 and stripper plate 62 is vertically shiftable as a unit by means of a fluid-operated actuator comprising a cylinder 68 and an actuator piston 70 therein, the latter being connected to the plate 58 so as to effect the actuation thereof. Cylinder 68 is adapted to sit within a suitable cavity within the foundation 54, as will be understood.

The several pedestals 50 carry an upper frame plate 72, FIG. 5, providing support for a depending matrix assembly 18a, functionally corresponding to the matrix 18 previously described with reference to FIG. 2. More specifically, matrix 18a comprises a sleeve 74 encompassed within a jacket or sleeve member 76 having suitable heater member 78 associated therewith.

The pivoted arm 60 of the vertically shiftable platen assembly 56 carries a mandrel or male die member 16a, FIGS. 5 and 7, functionally corresponding to the mandrel or male die member 16 previously described with reference to FIG. 2. Suitable heater means as indicated at 80, is also associated with the mandrel or male die member 16a. As best shown in FIG. 7, the mandrel 16a is fixedly carried by the pivot arm 60, and the stripper plate 62 slidably embraces the lower portion 24a of the mandrel member.

The stripper plate 62 is vertically actuated in respect to the plate 60 by means of a pair of fluid actuators 82, FIG. 7, the piston rods 84 of which are adapted to project through holes 86 in the arm 60 to engage and raise the stripper.

In the operation of the structure of FIGS. 5-9, the pivot arm 60 and the stripper plate 62 and mandrel 16a are pivoted manually clockwise to the dotted line position as shown in FIG. 9 so as to move the upper mandrel portion 22a forwardly of the matrix member 18a for ready accessibility. The rubber sleeve member 40 to be resized and cured is then placed on the upper end of the mandrel or male die member as shown in FIG. 5, after which the arm 60 and the mandrel are pivotally returned to the full line position of FIG. 9.

The piston 70 of actuator 68 is then projected upwardly, as shown in FIG. 6, so as to move the larger portion 24a of the male die member into the matrix assembly. During this operation the smaller upper end portion 22a of the mandrel moves into and through the orifice member 30a forming a part of the matrix assembly so as to accurately position and guide the mandrel in its movement into and through the matrix. As will be understood, and as previously described, the orifice member 30a is only slightly larger than the reduced end portion 22a of the mandrel, merely to provide a free sliding fit but preventing more than a flash portion of the rubber sleeve from passing therebetween. During this operation the rubber sleeve is projected over the shoulder 26a of the male die member so as to be received on the larger portion 24a thereof, as shown in FIG. 6, the rubber sleeve thus being compressed between and accurately sized by the cavity of the matrix and the larger mandrel portion, as previously described with reference to FIGS. 2 and 3. During this operation heat is also applied by means of the heaters to the rubber sleeve so as to effect the curing of the rubber material.

The platen structure 56 is then lowered by actuator 68 to the position shown in FIG. 7, and during this operation the rubber sleeve, which tends to contract, adheres to the larger mandrel portion, rather than to the surface of the matrix, and is moved downwardly with the mandrel, as shown.

Stripper plate 62 is then actuated upwardly, as shown in FIG. 8, by means of the actuators 82 and their associated pusher piston rods 84, so as to strip the rubber sleeve from the larger lower mandrel portion, and so as to push the sleeve onto and around the smaller upper mandrel portion to be loosely received thereby. The stripper plate is then retracted to the position of FIG. 7, after which the pivot arm 60 and the associated stripper and mandrel parts are again pivoted to the dotted line position of FIG. 9, whereupon the sized and cured rubber sleeve 40 is removed from the upper mandrel portion and a new sleeve to be cured and sized is again placed into position.

The specific examples herein shown and described should be considered as illustrative only. Various changes in structures and procedure may, no doubt, occur to those skilled in the art; and such changes are to be understood as forming a part of this invention insofar as they fall within the spirit and scope of the appended claims.

This application is a continuation-in-part of my co-pending application Serial No. 123,881, filed July 13, 1961, now abandoned.

The invention is hereby claimed as follows:

1. Apparatus for resizing a tubular element to predetermined inside and outside dimensions without substantial alteration of the length of the tubular element, and comprising a male die member including a first portion of predetermined length and having a substantially uniform transverse dimension on which the tubular element is telescopically supported prior to assembly of said male die member with a female die member, said male die member further including a second portion of substantially the same said predetermined length and of a greater substantially uniform transverse dimension than said first portion and corresponding to the predetermined inside dimension of the finished tubular element, the first and second portions of the male die member being joined by a gradual transfer portion to permit the tubular element to be bodily transferred from the first portion to the second portion upon assembly of the male die member with a female die member, a female die member having a cavity of a length substantially equal to the said predetermined length of said second portion of the male die member and of greater substantially uniform transverse dimension than the second portion of the male die member to freely receive the first portion of the male die member with the tubular element assembled thereon, the wall of said cavity corresponding to the predetermined outer dimension of the finished tubular element, said female die member further having an abutment surface for the tubular element at one end thereof coaxial with said cavity and extending toward the adjacent cavity wall surface, causing bodily transfer of the tubular element over said transfer portion to the second portion of the male die member as the second portion of the male die member is telescoped into the female die cavity with resultant sizing of the outer surface of the tubular element by the cavity wall of the female die member and of the inner surface of the tubular element by the surface of second portion of the male die member, and means closing the opposite end of the female die cavity when the second portion of the male die member is housed within the female die cavity, and means relatively telescoping the second portion of said male die member into the cavity of said female die member.

2. Apparatus for resizing a tubular element as defined in claim 1, wherein stripper means is provided for stripping the tubular element after the resizing thereof from the second portion of the male die member onto said first portion.

3. Apparatus for resizing a tubular element as defined in claim 1, wherein heating means is provided for heating the tubular element to cure it while on said male die member second portion.

4. Apparatus as claimed in claim 1, wherein said female die member includes a passageway at said one end coaxial with said cavity for receiving the first portion of the male die member and locating the said die members relative to each other upon movement of the second portion of the male die member into the cavity of the female die member and with the said transfer portion interconnecting said passageway and the adjacent surface of the cavity of the female die member.

5. The method of accurately resizing an elongated tubular element to predetermined inside and outside dimensions without substantial alteration of the length of the tubular element, and comprising the steps of supporting the tubular element on the smaller section of a stepped male die member having smaller and larger sections joined by a gradual transfer portion, introducing the smaller section of the male die member with the tubular element thereon into the cavity of a female die member to abut an inner portion thereof, thereafter urging the larger section of the male die member into telescoped association within the cavity of the female die member causing transfer of the tubular element from the smaller section of the male die member over the transfer portion to the larger section of the male die member and closing off the end of the cavity of the female die member adjacent the end of the telescoped larger section of the male die member whereby to compress the tubular element between the wall of the cavity of the female die member and the surface of the larger section of the male die member with resultant sizing of the outer surface of the tubular element by the cavity wall of the female die member and of the inner surface of the tubular element by the surface of the larger section of the male die member.

6. A method of accurately resizing an elongated tubular rubber element as defined in claim 4, including the step of heating the tubular element while on the larger portion of the male die member to effect the curing of the rubber thereof.

References Cited by the Examiner

UNITED STATES PATENTS

| | | | |
|---|---|---|---|
| 1,040,737 | 10/1912 | Murray | 18—42 |
| 1,461,299 | 7/1923 | Wehn | 264—323 X |
| 1,919,918 | 7/1933 | Whitehouse | 264—323 |
| 2,130,254 | 9/1938 | Visman. | |
| 2,194,488 | 3/1940 | Whitehouse | 18—14 |
| 2,611,154 | 9/1952 | Chevrier | 264—323 |
| 2,941,240 | 6/1960 | Distler | 18—14 |
| 3,008,187 | 11/1961 | Slade | 18—14 |
| 3,074,115 | 1/1963 | Abrecht | 18—5 |
| 3,103,170 | 9/1963 | Covington et al. | 264—320 X |

FOREIGN PATENTS

| | | |
|---|---|---|
| 236,731 | 8/1960 | Australia. |
| 505,484 | 9/1951 | Belgium. |

WILLIAM J. STEPHENSON, *Primary Examiner.*

ROBERT F. WHITE, J. SPENCER OVERHOLSER, *Examiners.*

R. B. MOFFITT, L. S. SQUIRES, *Assistant Examiners.*